United States Patent
Sangameswaran et al.

(10) Patent No.: US 12,001,825 B2
(45) Date of Patent: Jun. 4, 2024

(54) METHOD AND APPARATUS FOR VEHICLE SOFTWARE UPDATE INSTALLATION

(71) Applicant: FORD GLOBAL TECHNOLOGIES, LLC, Dearborn, MI (US)

(72) Inventors: Sangeetha Sangameswaran, Canton, MI (US); Jason Michael Miller, Woodhaven, MI (US); John Naum Vangelov, South Lyon, MI (US); Brennan Hamilton, Birmingham, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 767 days.

(21) Appl. No.: 15/047,715

(22) Filed: Feb. 19, 2016

(65) Prior Publication Data
US 2017/0242678 A1 Aug. 24, 2017

(51) Int. Cl.
G06F 9/445 (2018.01)
G06F 8/65 (2018.01)
G06F 8/656 (2018.01)
H04L 67/06 (2022.01)
H04L 67/00 (2022.01)

(52) U.S. Cl.
CPC ............... G06F 8/65 (2013.01); G06F 8/656 (2018.02); H04L 67/06 (2013.01); *H04L 67/34* (2013.01)

(58) Field of Classification Search
CPC ... G06F 8/61; G06F 8/65; G06F 8/665; H04L 67/12; H04L 67/325; H04L 67/34; H04L 29/06; H04L 69/329; H04L 67/06; G08G 1/096827; H04W 4/04

USPC ........................................................ 717/170
See application file for complete search history.

(56) References Cited

U.S. PATENT DOCUMENTS

| 7,366,589 | B2 | 4/2008 | Habermas |
| 2007/0067763 | A1* | 3/2007 | Sonbarse et al. ....... G06F 8/656 717/168 |
| 2011/0173457 | A1 | 7/2011 | Reh |
| 2012/0015642 | A1 | 1/2012 | Seo |
| 2013/0210525 | A1* | 8/2013 | Sizelove ............ B64D 11/0015 463/37 |
| 2013/0268754 | A1* | 10/2013 | Baltes ................... H04L 9/3247 713/156 |

(Continued)

FOREIGN PATENT DOCUMENTS

| CN | 1858704 A | 11/2006 |
| CN | 101026848 A | 8/2007 |

(Continued)

*Primary Examiner* — Wei Y Zhen
*Assistant Examiner* — Mohammed N Huda
(74) *Attorney, Agent, or Firm* — Joseph Zane; Brooks Kushman P.C.

(57) ABSTRACT

A system includes a processor configured to detect a vehicle key-off. The processor is also configured to delete from a primary memory ("internal memory") of an electronic control unit an existing software version for which a new software version update exists in a secondary memory of the ECU. The processor is further configured to load the new software version from the secondary memory ("external memory") into the primary memory and upon detection of a failure during the load, delete the new software version from the primary memory and reload the existing software version from the secondary memory.

17 Claims, 5 Drawing Sheets

(56) References Cited

U.S. PATENT DOCUMENTS

| | | | |
|---|---|---|---|
| 2014/0282467 A1 | 9/2014 | Mueller et al. | |
| 2015/0301821 A1* | 10/2015 | Danne et al. | H04L 67/706 717/169 |
| 2016/0041820 A1* | 2/2016 | Ricci et al. | G06F 8/65 717/172 |

FOREIGN PATENT DOCUMENTS

| | | |
|---|---|---|
| CN | 103197943 A | 7/2013 |
| CN | 103425549 A | 12/2013 |
| CN | 104461654 A | 3/2015 |

* cited by examiner

METHOD AND APPARATUS FOR VEHICLE SOFTWARE UPDATE INSTALLATION

TECHNICAL FIELD

The illustrative embodiments generally relate to a method and apparatus for vehicle software update installation.

BACKGROUND

Vehicle telematics units and vehicle computing and infotainment systems are highly prevalent in modern vehicles. These systems allow for integration of applications from remote sources, playback of media and content in a vehicle, communication with remote sources and general provide a more favorable driver experience. Because these systems, and other vehicle electronic control units (ECU) frequently rely on some form of updateable software/firmware components, and because software is constantly being updated to provide compatibility between components, among other things, customers must often visit the dealer at least several times a year to have a diagnostic and update run on their vehicle computing systems as a whole. Currently, this is done by physically connecting the vehicle to an update-providing system and having the updates installed by the dealer. This allows the dealer to ensure that the most recent modules and versions are installed, prevents the customer from manually having to tinker with the vehicle computing software, and allows the original equipment manufacturer (OEM) to obtain a snapshot of the current software and firmware versions installed on a vehicle.

Often, a vehicle ECU will only contain a single on-board flash memory, usable to execute instructions, boot, configure the ECU, etc. If this memory is over-written, during an update, the contents thereof cannot be restored. If the update results in an error, the old code or another version of the new code may need to be downloaded before the ECU will be functional again.

SUMMARY

In a first illustrative embodiment, a system includes a processor configured to detect a vehicle key-off. The processor is also configured to delete from a primary memory ("internal memory") of an electronic control unit an existing software version for which a new software version update exists in a secondary memory of the ECU. The processor is further configured to load the new software version from the secondary memory ("external memory") into the primary memory and upon detection of a failure during the load, delete the new software version from the primary memory and reload the existing software version from the secondary memory.

In a second illustrative embodiment, a computer-implemented method includes deleting from internal memory an existing software version for which a new software version update exists in external memory in response to a vehicle key-off event. The method also includes loading the new software version into the internal memory from the external memory and, responsive to a failure in the loading, deleting the new software version from the internal memory and reloading the existing software version from the external memory.

In a third illustrative embodiment, a non-transitory computer-readable storage medium stores instructions which, when executed, cause a vehicle processor to perform a method including deleting an existing software version from internal memory if a new software version update exists in external memory in response to a vehicle key-off event. The method also includes loading the new software version into the internal memory from the external memory and, responsive to a failure in the loading, deleting the new software version from the internal memory and reloading the existing software version from a location where the existing software version exists in the external memory.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
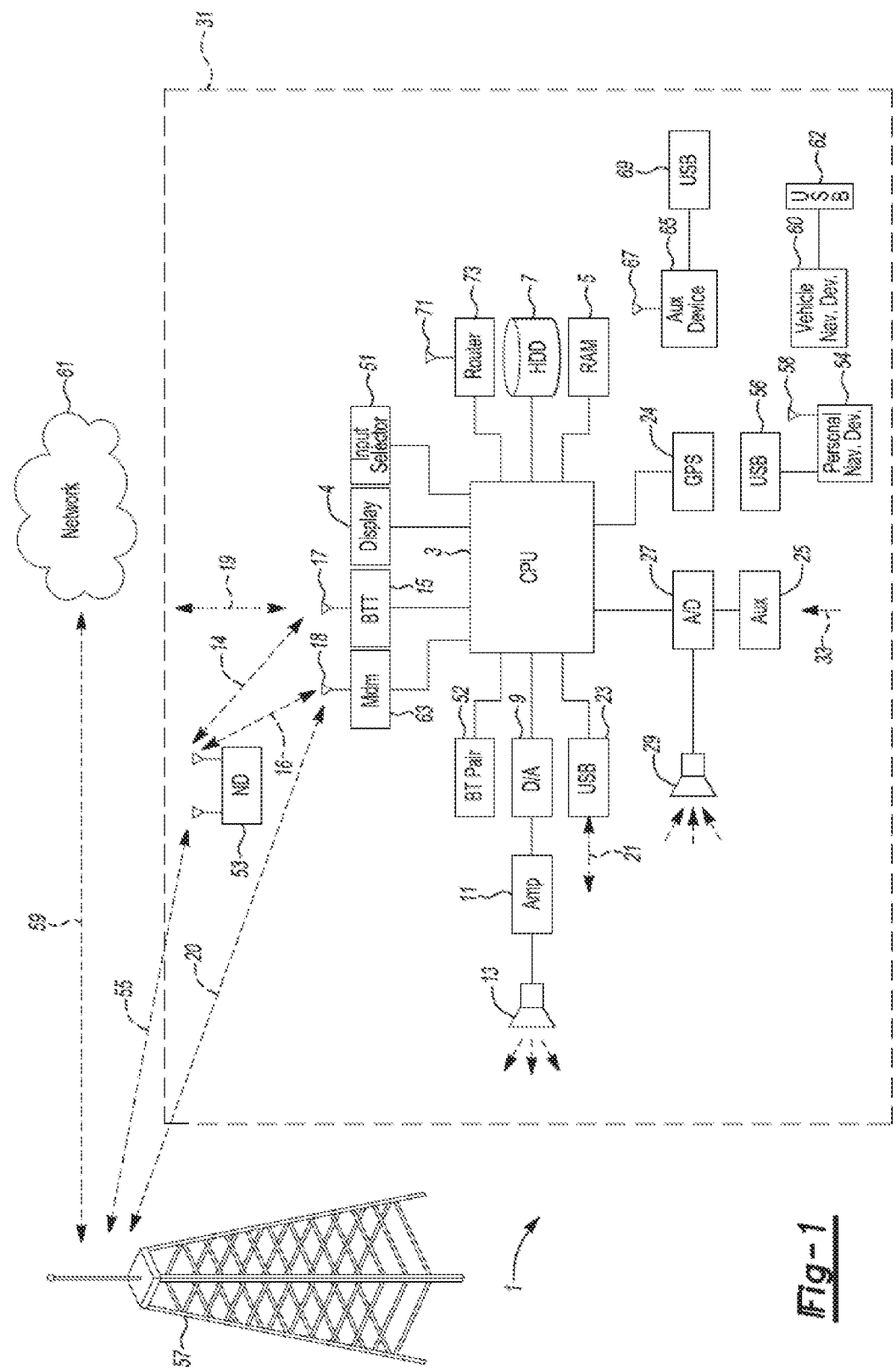
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

While current vehicle computing systems allow for complete updating of software and firmware via a dealer interface, such systems also require that the customer visit a dealer or other licensed service provider. This can create a delay in obtaining updates, as customers will frequently wait until the vehicle needs physical servicing, is due for an oil change or tire rotation, or simply fail to have the software updated altogether. Since the software and firmware updates frequently improve performance or are needed for security purposes, customers may not be getting the full, optimal experience from their vehicle unless they make it a point to keep their software up to date, which, under the dealer-update model, may require frequent trips to a dealer or maintenance location for updating.

The illustrative embodiments provide exemplary systems and methods for obtaining over-the-air (OTA) updates that allow a customer to update vehicle software without having to visit a dealer. The proposed solutions and examples provide an efficient and reliable means of updating vehicle software and firmware, with minimal customer interaction and impact. Also, the OEM can track which updates have been provided and/or applied to which vehicles, so it is possible to have a good sense of which software and firmware versions are highly prevalent in deployed vehicles, which can assist in focusing update efforts and allow for early identification of issues and notification of the appropriate parties if, for example, any version-specific issues arise.

Figure 2A:
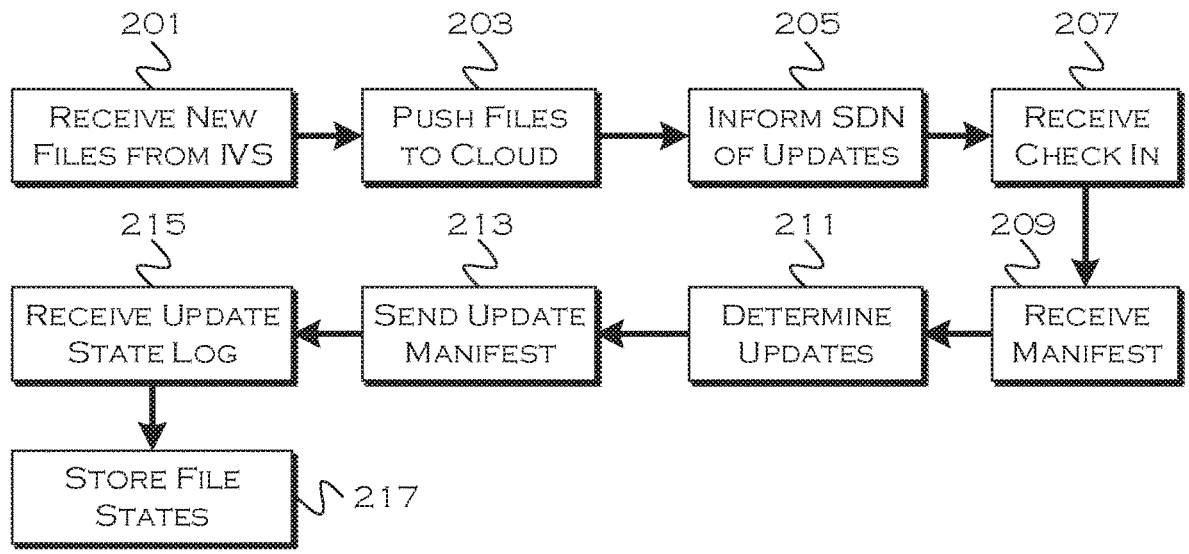
FIG. 2A shows an illustrative cloud-side process for providing a vehicle software/firmware update.

FIG. 2A shows an illustrative cloud-side process for providing a vehicle software/firmware update. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this illustrative example, an OEM engineer or other party designated to provide software and firmware updates can upload the software to an initial system repository, such as an in-vehicle software system (IVS) that is designated to receive updates from one or more parties. These files are then sent to a global in-vehicle information system (GIVIS) where the software can be stored for download by vehicle tools. After the GIVIS system receives the software from the IVS system 201, the GIVIS system can push the software to the cloud 203, which is where the software can be provided to remotely connected vehicle telematic control units (TCU)s.

In addition to pushing the files to the cloud (or otherwise making the files wirelessly available), the GIVIS system can tell a service delivery network (SDN) to inform particular vehicles that an update to an installed software or firmware package is available 205 for download and installation.

In the illustrative embodiments, the backend OEM systems track which modules and versions are installed on a variety of vehicles that have allowed for OTA updates. This is information that can be received, for example, from a vehicle TCU and stored in a remote OEM database. For vehicles whose configuration is known, the SDN can identify which vehicles are appropriate for an update (based on known, installed software and firmware versions) and can send a message to those vehicles that a new package is ready for download. For other vehicles, that may not have reported yet, for example, the system can identify vehicles for updating based on initial builds, and can notify those systems as well. Since, in this example, the process will vet the installed software before providing the update, any incompatibility can be handled when the system is informed of the actual configuration.

As identified vehicles come online (e.g., without limitation, they are keyed-on), they can check-in with the update server based on the notification from the SDN, for example. The system receives the check-in 207 and a manifest of installed software and firmware on the vehicle 209. This could be a full list, or, in another example, could relate specifically to software packages and firmware packages which have been designated for update. The full list will provide the OEM with a current snap-shot of the vehicle, but the short list may take less time to assemble and transmit. The report can be configured as desired based on the trade-offs between transmission time, completeness, data-volume, etc.

Figure 2B:
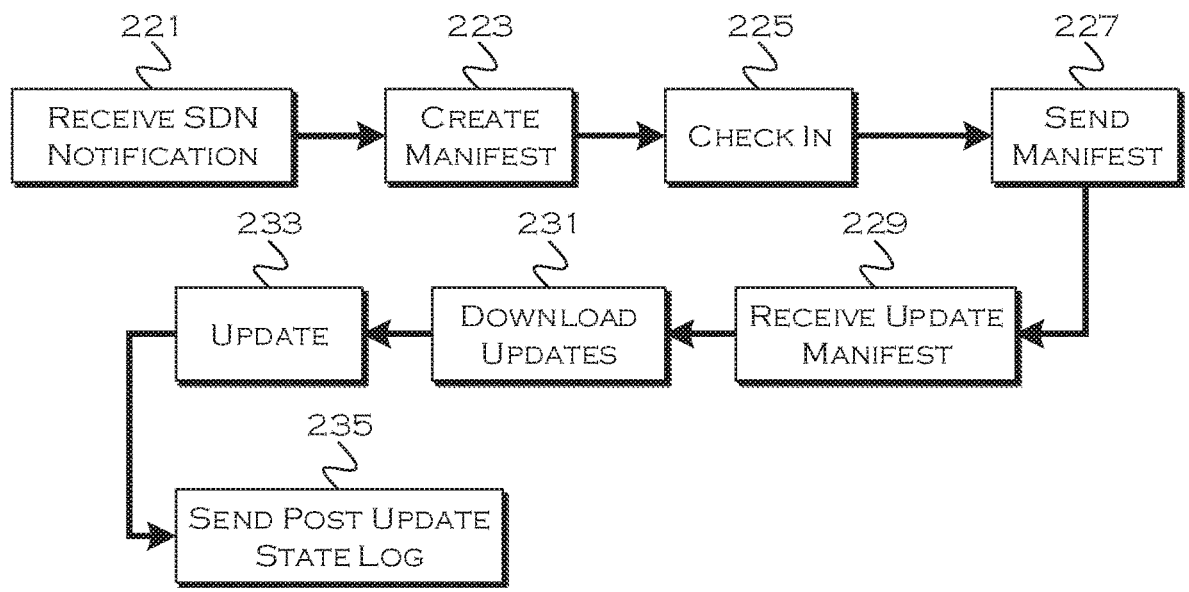
FIG. 2B shows an illustrative vehicle-side process for update handling.

Once the manifest is received from the vehicle 209, the process can determine which software and firmware is appropriate for updating, and assemble a list of available updates 211. This update manifest, identifying the updateable software/firmware and/or versions available for download, can then be sent to the vehicle 213. As shown in FIG. 2B, the vehicle will download appropriate software and, at some point when appropriate, install the software updates. Once the software updates have been successfully installed, the process will receive a state log identifying the success or failure of various update installations 215. This can be at a later point in time, since, for example, the download may occur at key-on and the install may occur at key-off (when the vehicle is not being used). The remote system can then store an updated snapshot 217 of some or all of the installed versions of software and firmware (depending on how much data is provided in the initial manifest and the update state log).

FIG. 2B shows an illustrative vehicle-side process for update handling. With respect to the illustrative embodiments described in this figure, it is noted that a general purpose processor may be temporarily enabled as a special purpose processor for the purpose of executing some or all of the representative methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this illustrative example, the process is a vehicle-side process which may not necessarily run to completion without pausing (i.e., there may be significant time-gaps between certain steps). The vehicle is notified, typically through the vehicle TCU, that an updated software package is available for that vehicle 221. This SDN notification can be used to place the vehicle in a state where the vehicle will check for an update when the vehicle is next keyed-on, for example.

At key-on, in response to the SDN notification, or at another appropriate time, the process will create a manifest of existing software and firmware versions installed on the vehicle 223. This can be a complete list of software and firmware, or can be limited, for example, to the versions of software and firmware for which an update is available. A third example of a list could be the versions of updateable software and firmware, as well as the versions of other modules that might be required for compatibility purposes (e.g., even if module Z is not updateable, it might have to be in version 2.0.1 for an update to module N to preserve compatibility, so the versions of both Z and N might be provided). Then, again at key-on or other designated time, the process will check-in with the GIVIS cloud 225 (or other software/firmware providing service) to obtain the updated software.

The process sends the manifest of installed versions to the GIVIS system 227, which allows the GIVIS system to check to ensure, for example, that the database record of installed software is correct. If the vehicle system has an unexpected updated version (which, for example, the user may have manually installed), the update may be aborted, or changed to a different update. Once the appropriateness of the updates has been verified or corrected, the vehicle system will receive an update manifest containing a list of the updateable software modules available for download 229.

The vehicle system will then download the appropriate updates (which could be all updates or some system or user selected subset thereof) 231. At some point the updates will also be installed 233, although as previously noted this could be at a different time. Since updates to vehicle modules may affect drivability while being installed, it may be desirable to wait until a vehicle is not being used (such as at key-off) before installing the updates. In another example, for a quick update, the system may simply prevent driving for a limited period of time while an update is applied. This latter model could be used, for example, when a high-priority security update is downloaded for installation, or at any other appropriate time. Once the updates have been installed, the process can send a post-update log to the GIVIS system 235, which can include the success or failure of updates, and may also include another full listing of presently installed software and firmware modules, if desired to maximize information about a present vehicle configuration.

Although not shown, it is also possible, for example, for the process to log or record the transmission of certain software version updates to a vehicle. This can help, for example, in identifying an update issue if a vehicle repeatedly receives updated versions but fails to successfully apply the update upon attempting an update.

Figure 3:
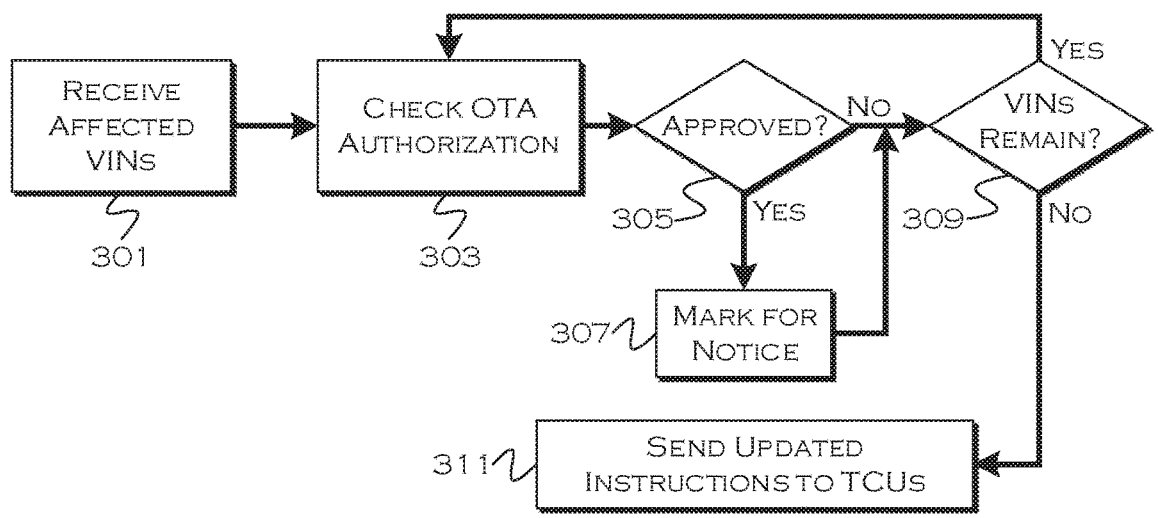
FIG. 3 shows an illustrative process for update notification.

FIG. 3 shows an illustrative process for update notification. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this illustrative example, the process runs on a service delivery network or other communication system designated for notifying vehicles about the availability of new updates. In this example, the process receives (or retrieves) the vehicle identification numbers (VIN)s of vehicles affected by a particular update 301.

The software and firmware configuration for each vehicle is stored in a database that may be populated and updated using various sources (from vehicle-reporting, dealer-reporting, known installed versions at production, etc.). The database can be queried, for example, to identify vehicles having a particular version of software N installed, such as vehicles having version 2.0.3, for example, to which a new update 2.0.4 is to be applied. In other examples, all vehicles having versions at or lower than 2.0.3 might be identified as candidates for updating to 2.0.4, depending, for example, on the particular update.

The vehicles can be identified by VIN, which can also be used to look up communication data allowing for messages to be sent to the specific, VIN-identified vehicles. In this example, to prevent notification to users who do not want OTA updates, the process checks each VIN to see if the user has agreed to the OTA updates 303. VINs that are not in the database may correspond to users that have not yet approved OTA updates, or that may not want OTA updates for a variety of reasons (such as a fleet manager who wants all vehicles at a same version level). If a given VIN has an approval associated therewith 305, the SDN can add that VIN to a list for notification 307. This process can continue as long as VINs remain 309 for approval verification. Once the VINs that have approved OTA updates have all been verified, the process can send update instructions, notifications, etc. 311 to the vehicles having the associated VINs.

Figure 4:
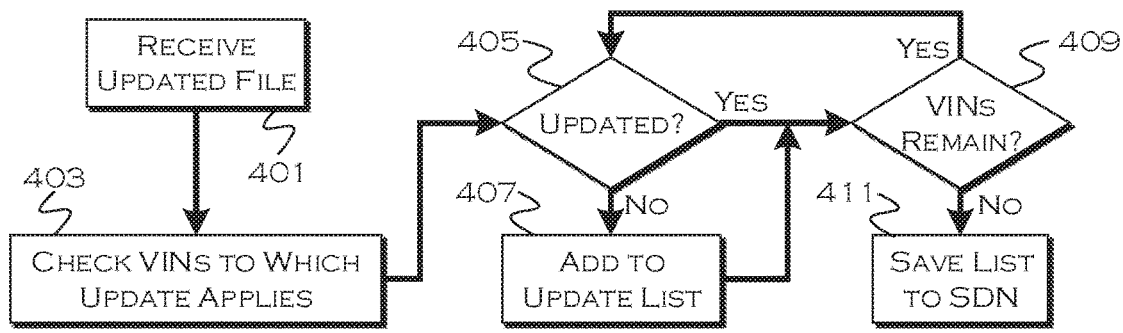
FIG. 4 shows another illustrative update notification process.

FIG. 4 shows another illustrative update notification process. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this illustrative example, the process running on the GIVIS, for example, receives an updated file from an OEM engineer or other party designated to provide updates 401. In this example, the GIVIS stores the records (or accesses the database storing the records) of vehicle configurations, and will simply provide a list of applicable VINs to the SDN for notification (which is the representative process described with respect to FIG. 3). Here, the process utilizes a database to determine which vehicles (by VIN, in this example) have software eligible for the received update 403. In this example, the process first sorts by software module 403, to determine which vehicles have the updateable module installed. Then, for each vehicle, the process determines if the software has already been updated 405 or is otherwise an inappropriate state for updating. If the software is already updated or is otherwise in an inappropriate state for updating 405, the process will continue to the next record 409. Otherwise, the VIN for that vehicle is added to an update list 407 to be sent to the SDN. Of course, any method of querying a database and assembling a list of records can be used, as the process shown is merely illustrative. Once all records have been analyzed, the process can send the list of appropriate VINs to the SDN, which can check for stored OTA approval as shown in FIG. 3. Although the GIVIS process in FIG. 4 and the OTA approval verification shown in FIG. 3 are described with respect to separate systems, they can be consolidated if desired and appropriate, depending on the layout and configuration of the back-end network providing the OTA software updates.

Figure 5:
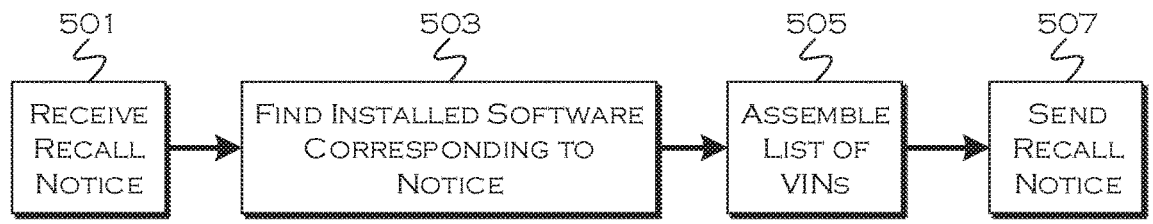
FIG. 5 shows an illustrative process for recall handling.

FIG. 5 shows an illustrative process for recall handling. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

FIG. 5 shows an illustrative recall notification process facilitated by having a more up-to-date record of currently installed software and firmware versions. While this could be used with any set of records reporting software and firmware versions installed in vehicles, the more up-to-date the records, the more accurate the delivery of the recall notices. If an OEM does not have any information about current software versions, for example, they may have to send a recall notice to all vehicle models having some version of a particular software or firmware module needing a particular update. On the other hand, if the update only applies, for example, to version 3.3.1, a complete or more-complete set of records can avoid issuing a recall notice to at least some vehicles for which the notice is inappropriate. For vehicles whose current configuration is unknown, or for which it has been a long time since update, the process may still choose to send the notice out of an abundance of caution. However, the process can avoid sending notices to vehicles for which it is known that the update has already been applied and/or which have versions that are past the version needing updating (3.3.2, for example).

The process receives a recall notice that applies to a particular software or firmware module installed in certain vehicles 501. Using database queries such as those previously described, the process can identify which vehicles are known to need an update, or, additionally or alternatively, which vehicles do not need an update 503. The process then can assemble a list of VINs for which notification should be sent (or in an alternative configuration, a list of VINs for which a notice is definitely not needed) 505. This list, in either form, can be used to limit the list of vehicles to which notification is sent, so at least some drivers are not unnecessarily notified about a recall which does not apply to their vehicle. The recall notice can then be sent to the appropriate vehicles.

As noted, there may still be some overlap and redundancy in notification using this process, based on incomplete information, but the better the information received from customer vehicles and dealer updates, for example, the more accurately targeted the recall notification can be. Similar methodologies can also be used for other targeted vehicle messaging, based on knowing which modules and versions are installed on which particular vehicles. Because the OTA updates allow for more frequent servicing of software and firmware modules without requiring the customer to make a trip to the dealer, the increased frequency can provide increased snapshot accuracy if such information is collected by the OEM.

Figure 6:
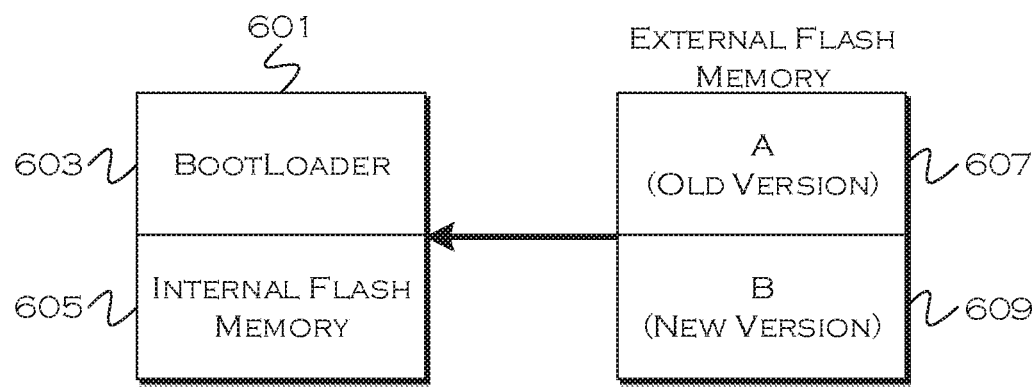
FIG. 6 shows an illustrative example of a vehicle memory system.

FIG. 6 shows an illustrative example of a vehicle memory system. A typical vehicle boot system 601 includes at least a bootloader 603 and some internal flash memory 605. This paradigm can be applied to any and all systems that require some form of startup, for example, upon vehicle key-on. The illustrative embodiments provide for installation (or flash) of a software update that may be stored in multiple locations. A resilient backup version of a currently installed software version also exists, in case the update fails. For example, a typical electronic control unit (ECU), only contains internal flash memory to which an operating/boot/control file and corresponding instructions are stored.

In this illustrative example, external or additional flash memory is provided having at least two sectors, partitions or in the form of at least two separate memories 607, 609. Thus, in at least one embodiment, an ECU containing the typical internal memory and a second, external memory is contemplated. This second memory could also be provided as "internal" memory on the ECU, i.e., similar to the standard memory but separately accessible. In such a case, the "internal" memory would be the memory which the ECU is using for instructions, and the "external" memory would be the memory used as secondary memory for the update processes. Whenever a new software update is loaded, the least recently used of the two memory partitions receives the update. The more recently used partition holds a copy of a currently installed version of the software. This solution is usable to implement an A and B update method (install to a new location, use the old location if the new installation doesn't work) on electronic control units that do not support relocatable code. In systems that support relocatable code, the bootloader can try to boot from a new location, and then revert to an old location if the boot is unsuccessful (e.g., the code is bad), but many ECUs do not support this model.

Figure 7:
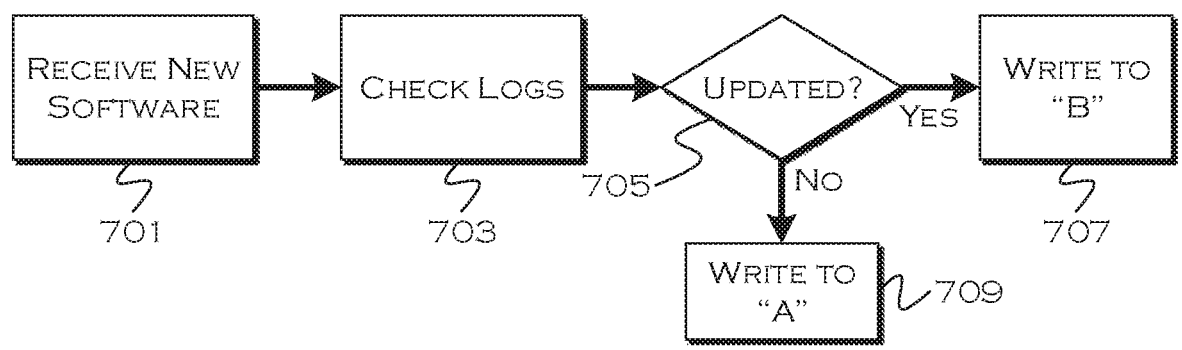
FIG. 7 shows an illustrative process for update loading.

FIG. 7 shows an illustrative process for update loading. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this illustrative example, the process receives a new software update 701. This could be software or firmware, and is designed, for example, to update an existing piece of code already executed by an existing ECU. In this example, the ECU has the existing software at a known flash memory location, from which the code is executed. External memory locations A and B are provided for holding the update and a backup version of the currently installed software (typically left over from a previous update).

This is a simplified example for describing the available external memory space. In a more complex example, where there is significant external memory space (locations/sectors), a sector designated for replacement or otherwise unused can be overwritten by the new software. For example, if two versions of a different software update existed for another module, only the most recent version might be preserved (if it has already been processed), so the older of the two versions can be overwritten by the new update, even though the update may be unrelated to the software being overwritten. This allows for reuse of memory space that is no longer needed to hold older backup versions of software which has been updated (meaning a newer update version may be stored elsewhere in the external memory).

Once the new software is received, the process can check installation logs, file creation dates, etc., to determine which of the external (or additional) memory locations, A or B, was previously used to install the currently existing version of the software 703. If the memory location was location A 705, the process loads the new update into location B 707. Location A continues to hold the previous update. Alternatively, if A was not used (which in this example means that B was last used), the process loads the new update into location A 709. The method shown is illustrative only, there are numerous possibilities for determining which location to which to write the update, and it is also possible that more than two external memory (or additional memory) locations are available to perform this process.

Figure 8:
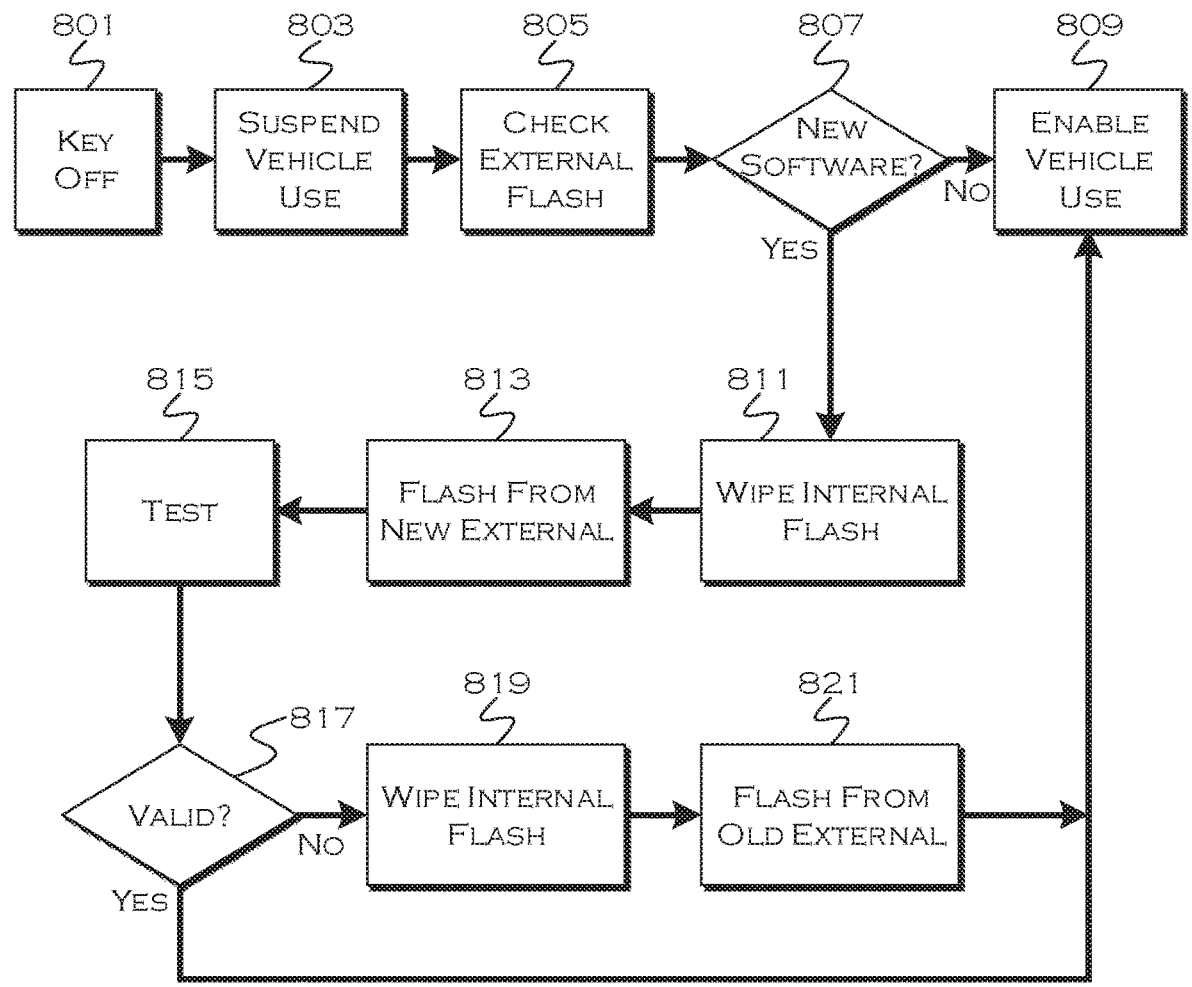
FIG. 8 shows an illustrative process for update handling.

FIG. 8 shows an illustrative process for update handling. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this illustrative example, the update will be installed at the key-off of the vehicle. This helps ensure that the owner isn't using the vehicle at the time the update is installed. In this illustrative example, vehicle utilization may be temporarily disabled, at least for some finite period of time, while the update is installed.

One the key-off has occurred 801, the process suspends vehicle use (or at least engine start up, or a similar suspension of the ability to drive the vehicle) 803. This suspension can last for the duration of the update, for a finite period of time, or generally until the vehicle is suitable to drive. The process also checks the external (or additional) flash memory 805, to determine if a new software update is present 807. In other embodiments, the process may only suspend the vehicle after the new software is determined to be present, although, in this example, since the vehicle is enabled for use 809 upon determining that there is no new software present, the few second delay or less that might occur is unlikely to significantly inconvenience an owner. If the delay is of concern, the process can wait until verifying the presence of a new update before suspending the vehicle from use.

Once the new update has been verified as being present, the process may then delete the existing software version from the internal flash memory 811. At this point, the internal memory has no installed software, which is why the use of the vehicle was briefly suspended while the update occurs, in case the software was/is needed when the vehicle is started. A new software version is flashed from the available update contained in the external memory space 813.

The newly installed version can be tested for errors and functionality 815. If an error is detected in the newly installed version (i.e., it is invalid) 817, the process can wipe the newly installed version from the memory 819. The previously installed version can then be reloaded from another external memory space 821, where the update that originally provided that version is stored.

For example, if two external memory locations, A and B, exist, and A holds the previously installed version, then new software will be loaded to location B upon download. Then, upon key-off, the process will suspend the vehicle operation and recognize that a new software update exists in location B (or vice versa). The process will wipe the existing version from internal memory (where the version is used by the bootloader).

A new version is loaded from external memory location B, which provides the vehicle system with the new software version (or firmware version). This newly loaded software is then checked for errors, in this example. If any errors are found, the process can again wipe the memory and load the old software version from memory location A. Since this corresponds to the previously installed version, it should presumably be error-free. If the process is unable to restore the old version, additional remedial steps can be taken. Additionally or alternatively, if an error is not detected until the bootloader attempts to use the newly installed software (which can be upon key-on or at some other, later time), the old version is still stored in location A and is available for use in restoring the old version.

If the number of updates for various vehicle software installations exceeds the existing number of external (or additional) memory locations plus one (for the update), then the "A" location described above (containing the old version) can be created by flashing/loading the current build/version to a first software location before processing the update from a new software location. This ensures that a backup of at least the software currently being updated currently exists in one additional location. Sufficient external/additional memory avoids this situation, but it is at least possible to re-create the existing software version by copying it, if a copy does not already exist in external memory, before wiping the internal memory of the current build.

While exemplary embodiments are described above, it is not intended that these embodiments describe all possible forms of the claimed subject matter. Rather, the words used in the specification are words of description rather than limitation, and it is understood that various changes may be made without departing from the spirit and scope of the disclosure. Additionally, the features of various implementing embodiments may be combined to form further embodiments that may not be explicitly described or illustrated.

What is claimed is:

1. A system comprising:
a processor configured to:
detect a vehicle key-off;
responsive to the key-off, suspending vehicle use until an update process can complete;
prior to terminating suspension of vehicle use:;
delete from a primary memory of an electronic control unit (ECU) an existing software version for which a new software version update exists in a secondary memory of the ECU;
load the new software version from the secondary memory into the primary memory; and
upon detection of a failure during the load, delete the new software version from the primary memory and reload the existing software version from the secondary memory; and
responsive to a functioning version of the existing software being in the primary memory as a result of the reload, terminating suspension of vehicle use.

2. The system of claim 1, wherein the processor is further configured to test the new software version following successful load to the primary memory.

3. The system of claim 2, wherein the processor is further configured to delete the new software version from the primary memory and reload the existing software version from the secondary memory upon detection of an error during the test.

4. The system of claim 1, wherein the processor is further configured to delete the new software version from the primary memory and reload the existing software version from the secondary memory if an error occurs when an electronic control unit attempts to utilize the new software version.

5. The system of claim 1, wherein the processor is configured to reload the existing software version from a location in the secondary memory in which an update resulting in the existing software version was previously stored when the existing software version was first loaded.

6. The system of claim 1, wherein the processor is configured to copy the existing software version to the secondary memory from the primary memory prior to deleting the existing software version, if the existing software version does not already exist in the secondary memory.

7. A computer-implemented method comprising:
detecting software ready to be loaded onto a vehicle and existing in memory of the vehicle;
responsive to a key-off of the vehicle and the detecting, suspending vehicle start up during software update;
deleting from internal memory an existing software version for which a new software version update exists in external memory in response to the vehicle key-off event and during a key-off state prior to a next key-on event;
during the key-off state, loading the new software version into the internal memory from the external memory;
following completion of the deleting and the loading, removing the suspension of vehicle start up; and
responsive to a failure in the loading, deleting the new software version from the internal memory and reloading the existing software version from the external memory.

8. The method of claim 7, further comprising testing the new software version following successful loading of the new software version into the internal memory.

9. The method of claim 8, further comprising deleting the new software version from the internal memory and reloading the existing software version from a location where the existing software version exists in the external memory responsive to an error during the testing.

10. The method of claim 7, further comprising deleting the new software version from the internal memory and reloading the existing software version from a location where the existing software version exists in the external memory responsive to an error occurring when an electronic control unit attempts to utilize the new software version.

11. The method of claim 7, wherein the reloading includes reloading the existing software version from a location in external memory in which an update resulting in the existing software version was previously stored when the existing software version was first loaded.

12. The method of claim 7, further comprising copying the existing software version to the external memory prior to deleting the existing software version, if an update corresponding to the existing software version does not already exist in the external memory.

13. A non-transitory computer-readable storage medium, storing instructions which, when executed, cause a vehicle processor to perform a method comprising:
suspending vehicle start-up responsive to a key-off state following detection of a new software version in vehicle memory;
deleting an existing software version from internal memory in response to the vehicle key-off event and during a key-off state prior to a next key-on event, during the suspension;
loading the new software version into the internal memory from the external memory during the suspension; and
responsive to a failure in the loading, deleting the new software version from the internal memory and reloading the existing software version from a location where the existing software version exists in the external memory; and
terminating the suspension of vehicle start-up responsive to completion of the reloading.

14. The storage medium of claim 13, the method further comprising testing the new software version following successful loading of the new software version to the internal memory, during the suspension.

15. The storage medium of claim 14, the method further comprising deleting the new software version from the internal memory and reloading the existing software version from a location where the existing software version exists in the external memory responsive to an error during the testing.

16. The storage medium of claim 13, the method further comprising deleting the new software version from the internal memory and reloading the existing software version from a location where the existing software version exists in the external memory responsive to an error occurring when an electronic control unit attempts to utilize the new software version.

17. The storage medium of claim 13, the method further comprising copying the existing software version to the external memory prior to deleting the existing software version, if an update corresponding to the existing software version does not already exist in the external memory.

\* \* \* \* \*